Nov. 21, 1939.  J. B. MOORE  2,181,023
CUTTING TOOL
Filed Jan. 8, 1937
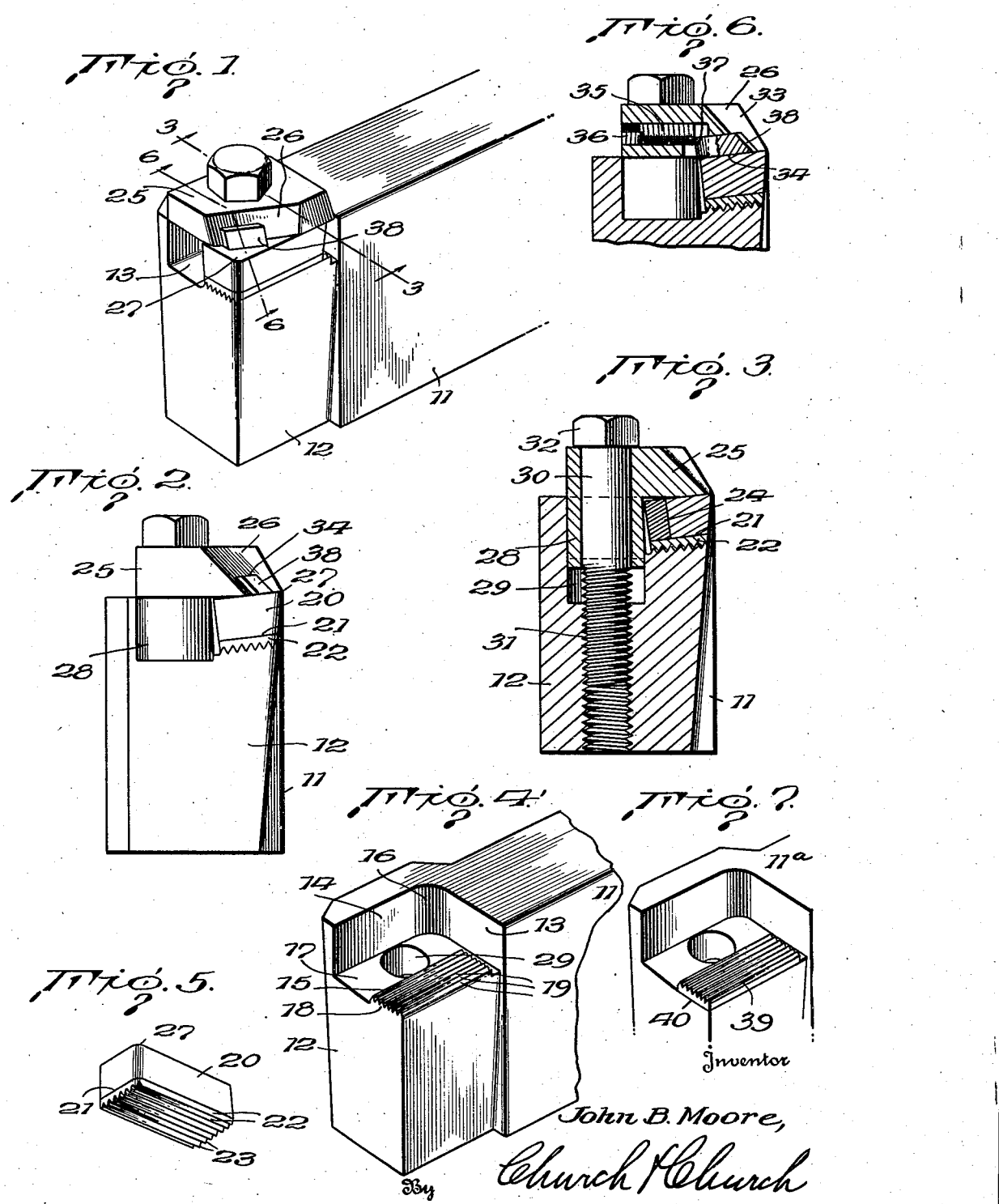
Inventor
John B. Moore,
By Church & Church
His Attorneys Patented Nov. 21, 1939

2,181,023

UNITED STATES PATENT OFFICE 2,181,023

CUTTING TOOL

John B. Moore, North Chicago, Ill., assignor to Vanadium-Alloys Steel Company, Latrobe, Pa., a corporation of Pennsylvania Application January 8, 1937, Serial No. 119,673

12 Claims. (Cl. 29—96)

This invention relates to cutting tools, and particularly to tools of the type used for metal turning and including a shank of steel, or similar material, upon which a relatively small tool bit or tip of extremely hard material is secured.

While many extremely hard materials, particularly cemented carbides of various metals, have been developed which have very desirable characteristics in the cutting of steel, such carbides and hard metal alloys are expensive and not very strong, as compared with the usual steels, and in general have a relatively low coefficient of expansion, which is usually about half that of steel. As a consequence, when a bit formed of such carbide or alloy is brazed or soldered to a shank or carrier of steel, the heat incident to use frequently causes unequal expansion which results in the formation of fine cracks in the bit. Moreover, the brazing of the bit to the shank, with or without an intermediate layer of other metal having a coefficient of expansion intermediate those of the bit and the carrier, presents a serious problem. If the braze is comparatively thin, so as to insure rigidity, particularly when a hard steel shank is used, the tendency of the bit to crack because of the difference in thermal expansion is increased. On the other hand, if the braze is too thick, or a shank of relatively soft steel is used, or an intermediate layer is used so that there are two brazed joints, between the bit and a shank of relatively soft steel, the braze tends to act as a cushion, and deformation and "mushrooming" of the tool results.

One of the objects of this invention is to provide a tool bit, and a support therefor, which will overcome these objections, and will permit a thin hard braze, and therefore a rigid support, without danger of breaking or cracking the carbide or alloy bit. A further object of the invention is to provide a structure of this kind in which a maximum proportion of the bit may be used up, as it is worn and then dressed to present the desired cutting edge and clearance. A further object is to provide a structure of this kind which will deflect and break the chips as they are cut from the work by the bit. A further object of the invention is to provide a removable tool bit of simple construction, which may be economically formed, and may be easily dressed to the desired shape. A further object of the invention is to provide a structure of this kind in which a permanent shank of hard steel may be used, which will not be deformed by the clamps by which it is mounted, which may be economically formed and which may be used continuously to support various interchangeable tool bits. Still further objects of the invention will be understood upon reading the following specification in conjunction with the accompanying drawing, in which an embodiment of the invention is illustrated, and in which:

Figure 1 is a fragmentary view in perspective of a lathe tool constructed in accordance with the invention;

Fig. 2 is a view in front elevation of the structure shown in Fig. 1;

Fig. 3 is a view in transverse section, taken on line 3—3 of Fig. 1, having a reshaped tool bit;

Fig. 4 is a fragmentary view in perspective, similar to Fig. 1, but showing various parts removed;

Fig. 5 is a view in perspective of the tool bit;

Fig. 6 is a fragmentary view in transverse section, taken on line 6—6 of Fig. 1; and Fig. 7 is a fragmentary view in perspective, similar to Fig. 1, but showing a modified form of shank structure.

In general, the invention comprises the provision of a detachably and adjustably mounted tool bit or tip formed of a body of cemented tantalum carbide, or similar material, having a thin supporting layer of hard steel, brazed to the lower surface thereof, the relative thickness of the cemented carbide or alloy body and the supporting layer being such that the supporting layer has a breaking strength less than that of the body, so that it, rather than the body of relatively expensive and hard material, will break under the bending strains incident to use, particularly those incident to thermal expansion. The invention also comprises the provision of a chip-breaking member, preferably of material similar to that of the body of the bit but separate therefrom, such member being adjustably mounted and so positioned relative to the cutting edge of the bit as to bend and break up the chips as they leave such cutting edge.

In the structure shown, a shank 11, preferably of rectangular cross section, for convenient mounting in a metal working machine, has an integral forward end portion 12 arranged at any desired angle to the shank and shaped as desired, a recess being provided therein which is open at the end and one side and defined by a rear wall 13, substantially perpendicular to the shank, a side wall 14, and a bottom wall 15. The rear and side walls preferably merge into a curved wall 16, and the bottom wall comprises a flat portion 17 and a serrated portion 18 which extends to the side edge of the shank and is inclined slightly upwardly from the flat portion. The serrations 19 of the serrated portion 18 extend substantially parallel to the side edge of the shank and are of regular formation, being preferably of V shape with their faces forming an angle of 60°. It will be apparent that the shank 11, as a whole, is of rather simple formation and it is preferably formed of hard steel, so as to insure long life and prevent bending or deformation incident to its use.

A tool bit 20 is provided which may be formed of tantalum carbide, or similar material, brazed at 21 to an underlying supporting layer 22 of hard tempered steel which is formed on its lower surface with serrations 23 corresponding in size and shape with the serrations 19 of the shank. The steel base 22 is so constructed as to have a breaking strength under bending strains that is definitely less than that of the bit 20. This relation is effected, in the structure shown, by making the base 22 of a thickness less than half that of the bit 20, and co-extensive with the lower surface of the bit to provide maximum support. The parts are of simple construction, and may be readily formed, and a thin hard braze may be effected without danger that the bit will be cracked in use. For this purpose, manganese bronze, or even strong high melting point brazing materials such as "stellite", may be used. It will be apparent that, while a thin hard braze is desirable, great precision in the formation of the braze is not necessary, because the hard steel base 22 will not be mushroomed, as a soft steel shank would be, and because there is no need to avoid an exceptionally thin braze in order to avoid cracking of the tip, as is the case when a tip is brazed directly to a shank, by reason of the fact that the shank is of much greater mass and strength.

The inclination of the serrated surface 18 has the advantage, among others, of making it possible to provide the desired angle of the cutting edge on a bit which is of uniform thickness, and which therefore may be easily and accurately formed, and will maintain its thickness at the cutting edge as it is dressed to shape.

It will be apparent that, as the bit 20 is dressed, to reshape it to correct inaccuracies due to wear, and is thereby reduced in width, it can be shifted laterally by the space of one serration, and it can be adjusted in any desired position longitudinally by sliding it in the direction of the serrations. If desired, the bit 20 may be almost entirely used up by reinforcing it, as shown in Fig. 3, along one side edge when it has been reduced along the opposite side edge to the extent of being too narrow to insure that it will be clamped securely and rigidly. Such reinforcement may be effected by brazing to the rear edge of the bit a strip 24 of material having approximately the same coefficient of thermal expansion, such as a nickel-tungsten alloy or molybdenum metal, to restore the bit unit substantially to its original form and size. It is, of course, preferable in such case that the bit 20 and reinforcing strip 24 be brazed to a steel base 22 of full width.

A clamp 25 is provided to hold the bit 20 to the shank portion 12, the head of the clamp having a portion partially overlying the bit 20 but cut away at one corner, as shown, to provide a surface 26 which is inclined laterally and downwardly to expose the corner of the bit 20 adjacent its cutting edge 27. The body of the clamp 25 is of such size and shape as to fit in the recess in the shank, and has a cylindrical portion 28 extending downwardly into a similar opening 29 in the shank. A cap screw 30 is threaded at 31 in the shank and extended through the cylindrical portion 28, and has a head 32 engaging the upper surface of the clamp, so that the parts may be rigidly clamped together. The bit unit is preferably of uniform thickness and cross section throughout its length, with all of its surfaces flat, except for the serrations 23 and the rounded corner at the cutting edge 27. Since the serrated portion 18 of the recess in the shank slopes slightly upwardly to its outer edge, the outer edge of the clamp 25 will be the first portion thereof to engage the bit 20 and the clamping action will tend to bend the head of the clamp relative to its cylindrical portion 28, thus utilizing the resiliency of the clamp and cap screw to hold the bit firmly in position.

A chip-breaking member 33 is mounted in a groove 34 in the lower face of the head of the clamp 25, so as to be slidable along the upper surface of the bit 20. The groove 34 is preferably inclined forwardly, so that the forward edge of the member 33 is directed substantially toward the rounded cutting edge 27, and an adjusting screw 35 is provided in a laterally directed bore 36 and having a flat end in engagement with the end of the member 33, which is rounded, as shown at 37 in Fig. 2. The chip-breaking member 33 is made of an extremely hard material, such as that of which the bit 20 is formed, and its end is shaped to provide a flat face 38 inclined upwardly, laterally and rearwardly from the upper face of the bit 20. It will be apparent that the chip-breaking member can be adjusted to locate its inclined face 38 at the required distance from the cutting edge, as the chips to be formed are thick and heavy or comparatively thin and light, respectively, and to maintain sufficient space between it and the cutting edge to prevent choking the flow of chips. The provision of the chip-breaking surface on a separate member, which can be adjusted as desired, avoids the repeated and laborious shaping and increased loss of expensive metal that is entailed when such surface is formed on the cutting bit itself or on a part which is not adjustable as to position, and thereby effects a great saving of material and of time. As the chips are formed at the cutting edge 27 they are directed almost longitudinally of the shank 11 but curling upwardly, and upon engagement with the face 38 they will not only be bent further in an upward direction but will also be bent laterally.

As shown in Fig. 7, the serrations on the shank may be conveniently provided by forming them on a facing member 39 of hard steel and brazing such facing member to the shank 11ᵃ, as shown at 40. Brazing materials such as manganese bronze or "stellite" may be used, and great precision in forming the braze is not necessary, as there will be no tendency to "mushroom", since the shank is formed of hard steel. It is necessary that the serrations of the facing member 39 correspond accurately with those of the base 22 of the bit or tip. To insure this accuracy, the parts are so designed that the facing member 39 is of the same thickness as the base 22. A single strip of steel of uniform thickness may then be machined to form the serrations, and consecutive pieces may be cut from such serrated strip and used, respectively, as the facing 39 of the shank 11ᵃ and as the base member 22 of the bit. It will be apparent that, by forming the two parts as a single separate piece, greater accuracy can be obtained than when the serrations are formed directly on the shank and on the base portion 22 of the bit. While it is preferable that the serrations be such as to form ridges having the shape in cross-section of an equilateral triangle, it will be apparent that such shape is not essential so long as the ridges are all of the same shape and are regularly spaced.

While various structures embodying the invention have been shown and described, it will be understood that many changes in details of construction and material may be made without departing from the spirit of the invention, which is defined in the following claims.

What I claim is:

1. A laminated tool tip comprising a body layer of hard high-speed cutting material and a base layer of hard metal brazed together, said base layer having parallel serrations on the face remote from said body layer, the coefficients of thermal expansion of said material and said metal being essentially different and said body layer having a breaking strength materially greater than that of said base layer.

2. A laminated tool tip comprising a body of hard high-speed cutting material and a base secured thereto formed of hard metal, and having parallel projections of uniform size and shape on the face remote from said body, said material having a coefficient of thermal expansion essentially less than that of said metal, and said base having a maximum thickness less than half that of said body and a breaking strength less than that of said body.

3. A tool tip comprising a body of cemented carbide having a flat face and a base of hard steel having a flat face brazed to the flat face of said body, said body having greater breaking strength than said base, and said base having parallel projections of uniform cross section on that face remote from said body.

4. A cutting tool, comprising a carrier, a tool tip comprising a body portion of hard high-speed cutting material and a base of hard metal brazed thereto and having a breaking strength lower than that of said body and means for detachably clamping said tool tip to said carrier operating substantially in the direction of the cutting thrust.

5. A cutting tool, comprising a carrier, a laminated tool tip comprising a body portion of hard high-speed cutting material and a base of hard steel permanently secured thereto and having a breaking strength lower than that of said body, said carrier and said base having interlocking projections of uniform size and shape, and means engaging the face of said tool tip opposite said base for clamping said tool tip to said carrier.

6. A cutting tool comprising a carrier, a tool tip mounted on said carrier and having a cutting edge, clamping means detachably securing said tool tip to said carrier, and a deflector member having a face in line with, and inclined upwardly and laterally with respect to, the flow of chips from the cutting edge of said tool tip, said deflector member being mounted on said carrier and adjustable relative to said securing means and said tool tip to vary the spacing of said face and the cutting edge of said tool tip.

7. A cutting tool comprising a carrier, a tool tip mounted on said carrier and having a cutting edge, clamping means detachably securing said tool tip to said carrier, and a deflector member having a face inclined at an angle to the direction of flow of chips from said cutting edge, said deflector member being adjustable laterally of the direction of flow of chips from said cutting edge, independently of said clamping means.

8. A cutting tool comprising a carrier, a tool tip mounted on said carrier and having a cutting edge, a clamping member mounted on said carrier for detachably clamping said tool tip thereon, and a deflector member adjustably mounted in said clamping member for movement across a face of said tool tip at an angle to the direction of flow of chips from said cutting edge.

9. A cutting tool comprising a carrier, a tool tip mounted on said carrier and adjustable longitudinally thereof and having a cutting edge at its forward end, and a deflector member having a face inclined laterally and upwardly with respect to said cutting edge and adjustably mounted on said carrier for movement transversely of said carrier.

10. A cutting tool comprising a carrier, a tool tip mounted on said carrier comprising a body of hard high-speed cutting material having parallel faces one of which is formed with a cutting edge and a base of hard metal secured to the face opposite to that having the cutting edge, said carrier and said base having interengaging projections of regular formation, and clamping means cooperating with that face of said tip opposite said base adjacent said cutting edge detachably securing said tool tip to said carrier in any one of a plurality of adjusted positions.

11. A cutting tool comprising a carrier, a tool tip, said tool tip and said carrier each having a layer of hard metal secured thereto, said layers having interengaging regular projections, and means detachably securing said tool tip to said carrier with said layers in engaging relation.

12. A cutting tool, comprising a carrier, a tool tip, said tool tip and said carrier each having a layer of hard metal formed with serrations, said layers being of the same thickness, and means detachably securing said tool tip to said carrier with said serrations interengaged.

JOHN B. MOORE.